United States Patent
Haider et al.

(10) Patent No.: US 9,365,267 B2
(45) Date of Patent: Jun. 14, 2016

(54) FLOATING PLATFORM

(75) Inventors: Markus Haider, Vienna (AT); Franz Rammerstorfer, Klosterneuburg (AT); Helmut Böhm, Linz (AT); Christian Diendorfer, Vienna (AT); Florian Toth, Vienna (AT)

(73) Assignee: Technische Universität Wien, Vienna (AT)

(*) Notice: Subject to any disclaimer, the term of this patent is extended or adjusted under 35 U.S.C. 154(b) by 223 days.

(21) Appl. No.: 14/232,068

(22) PCT Filed: Jul. 9, 2012

(86) PCT No.: PCT/AT2012/050096
§ 371 (c)(1),
(2), (4) Date: Apr. 14, 2014

(87) PCT Pub. No.: WO2013/006881
PCT Pub. Date: Jan. 17, 2013

(65) Prior Publication Data
US 2015/0298774 A1    Oct. 22, 2015

(30) Foreign Application Priority Data
Jul. 13, 2011  (AT) ................. A 1028/2011

(51) Int. Cl.
*B63B 35/44* (2006.01)
*B63B 3/08* (2006.01)
(Continued)

(52) U.S. Cl.
CPC . *B63B 35/44* (2013.01); *B63B 3/08* (2013.01); *B63B 39/03* (2013.01); *F24J 2/5267* (2013.01); *B63B 2035/4453* (2013.01); *Y02E 10/47* (2013.01)

(58) Field of Classification Search
CPC .................................. B63B 35/44; B63B 3/08
USPC ................................................ 114/264–267
See application file for complete search history.

(56) References Cited

U.S. PATENT DOCUMENTS 3,344,764 A * 10/1967 Ziermann ........... B63B 35/4413
114/121
3,673,975 A * 7/1972 Strauss ................... B63B 35/44
114/264

(Continued)

FOREIGN PATENT DOCUMENTS

DE  1267129 B     4/1968
EP  1925548 A1 *  5/2008 ............. B63B 35/34

(Continued)

OTHER PUBLICATIONS

Int'l Preliminary Report on Patentability issued Jan. 13, 2014 in Int'l Application No. PCT/AT2012/050096.

(Continued)

*Primary Examiner* — Lars A Olson
*Assistant Examiner* — Jovon Hayes
(74) *Attorney, Agent, or Firm* — Panitch Schwarze Belisario & Nadel LLP

(57) ABSTRACT

A floating platform is provided including the following: a covering element; at least three buoyant bodies, which are separated from each other, are fixedly mounted to the lower face of the covering element, are open toward the bottom, and are made of a gas-tight, pressure- and corrosion-resistant flexible material. The buoyant bodies enclose a closed hollow space when coming into contact with a liquid surface. At least one compressed-air generating device is also provided for generating an overpressure in the individual hollow spaces.

13 Claims, 6 Drawing Sheets

(51) Int. Cl.
  *B63B 39/03* (2006.01)
  *F24J 2/52* (2006.01)

(56) References Cited

U.S. PATENT DOCUMENTS

| | | | | |
|---|---|---|---|---|
| 4,988,317 A * | 1/1991 | Rubinsak | ................ | B63B 35/34 |
| | | | | 114/265 |
| 5,375,550 A * | 12/1994 | Innis | ................ | B63B 3/08 |
| | | | | 114/266 |
| 5,743,205 A * | 4/1998 | Morris | ................ | B63B 35/34 |
| | | | | 114/266 |
| 7,823,525 B2 * | 11/2010 | Brown | ................ | B63B 35/44 |
| | | | | 114/264 |
| 2003/0140838 A1 * | 7/2003 | Horton, III | ............. | B63B 9/065 |
| | | | | 114/264 |
| 2009/0133732 A1 * | 5/2009 | Hsia | ................ | F24J 2/4629 |
| | | | | 136/206 |
| 2010/0288178 A1 * | 11/2010 | Mansour | ................ | B63B 39/00 |
| | | | | 114/265 |
| 2012/0255736 A1 * | 10/2012 | Maher | ................ | E21B 19/004 |
| | | | | 166/339 |

FOREIGN PATENT DOCUMENTS

| | | | | |
|---|---|---|---|---|
| GB | 2463476 A * | 3/2010 | ............. | B63B 35/38 |
| JP | 58-152696 A | 9/1983 | | |
| NL | 1024893 C1 | 5/2005 | | |
| WO | WO 2006001796 A1 * | 1/2006 | ............. | B63B 35/44 |
| WO | 2009131826 A2 | 10/2009 | | |

OTHER PUBLICATIONS

Office Action issued Mar. 5, 2012 in AT Application No. 1028/2011.
Int'l Search Report issued Sep. 27, 2012 in Int'l Application No. PCT/AT2012/050096.
Int'l Preliminary Report on Patentability issued Jul. 2, 2013 in Int'l Application No. PCT/AT2012/050096.
English translation of the Int'l Preliminary Report on Patentability issued Jul. 2, 2013 in Int'l Application No. PCT/AT2012/050096.

\* cited by examiner

FLOATING PLATFORM

CROSS-REFERENCE TO RELATED APPLICATIONS

This application is a Section 371 of International Application No. PCT/AT2012/050096, filed Jul. 9, 2012, which was published in the German language on Jan. 17, 2013, under International Publication No. WO 2013/006881 A1 and the disclosure of which is incorporated herein by reference.

BACKGROUND OF THE INVENTION

The invention relates to a floating platform, in particular for plants for the production of solar energy.

The production of so-called alternative energy, in particular of solar energy, has been continuously rising. Due to the relatively large space required for solar power plants, the aim is to transfer them to water surfaces, in particular of the oceans ("offshore solar power plants"). Recently, various floating platforms have been developed for this purpose to carry the respective plants. Because of the requirements of a simple and lightweight design with at the same time high load capacity, the newest platforms developed are carried by air cushions.

International patent application Publication No. WO 2009/001225 A2 describes a circular floating platform having an outer ring structure and a flexible cover sealed to the upper surface of the outer ring structure, and thus defines a hollow space that can be set under over-pressure by a compressor to create the required buoyancy. The entire platform is rotatable, so that it can be oriented according to the position of the sun. In addition, the top surface of the platform can be bulged by the over-pressure which facilitates rainwater runoff.

Even though that platform is said to be suitable for land and sea use, it can be seen from preferred embodiments, in which the rotation is achieved by wheels in a ring surrounding the platform, that it is mainly aimed at use on land, i.e. floating in a circular basin.

Instead of the above outer ring, Austrian Patent Application AT 509,639 A1 to Heliovis, published after the priority date of the present application, uses a sealing element open at the bottom in the form of a wall to be immersed into the water and surrounding the platform, which wall again defines a hollow space under a planar cover element of the platform, which is filled with pressurized air. The wall can either be a flexible plastic membrane or a rigid material, e.g. sheet metal. At the bottom edge, the wall can be loaded with weights to guarantee immersion.

In addition, two such walls can run parallel with each other and divide the hollow space into an inner area and an outer annulus. The outer annulus can be divided into segments by radial partition walls. Alternatively, the entire hollow space can be divided into honeycomb or checkered sections by partition walls orthogonal to each other. Such partitions increase safety and allow the adjustment of different pressures in individual sections, e.g. to tilt the platform for draining off rainwater.

The main disadvantage of the embodiments according to the state of the art is that the individual floating platforms are not sufficiently protected against tilting due to waves, which reduces the efficiency of solar power plants carried thereon.

BRIEF SUMMARY OF THE INVENTION

The object of the present invention was thus the provision of a floating platform having better floating properties and particularly having better protection against effects due to waves and wind.

The present invention achieves this object by providing a floating platform comprising the following: a cover element; at least three buoyancy bodies separated from each other and attached in a stationary manner to the bottom of the cover element, which are open at the bottom and made of a gas-tight, pressure- and corrosion-resistant, flexible material, which buoyancy bodies each enclose a closed hollow space at contact with the surface of a liquid; and at least one device for generating pressurized air for generating an over-pressure in the individual hollow spaces.

By providing several buoyancy bodies separated from each other, which can be filled with pressurized air, lateral pressure exerted by approaching waves or wind cannot be transmitted from one buoyancy body to the next, as it is the case when simple divisions by partition walls are provided. In addition, the individual buoyancy bodies collectively counteract tilting of the platform: when the platform is tilted due to an external load or any other interference with the balance. The elevation of one side, as caused by the tilting, should increase the volume of the hollow space of the buoyancy bodies at this side. Due to the gas-tightness, however, the air pressure in this hollow space is reduced and thus counteracts the elevation. When tilting occurs, the pressure in the hollow spaces at the opposite side is simultaneously increased due to the immersion of the buoyancy bodies, which also counteracts tilting. The different pressures arising in the various chambers thus provide the platform with floating stability. In this manner, not even high waves or strong wind can tilt the inventive platform to a considerable extent. Even though another advantage of the invention is that the entire platform can be constructed of lightweight components.

However, desired tilting of the platform, particularly for orienting solar collectors or the like carried thereon according to the position of the sun, is definitely possible by setting different pressures in buoyancy bodies at opposite sides of the platform.

The material of the buoyancy bodies is not particularly limited, and plastic foils may for example be used. Preferably, membranes made of fiber-reinforces plastics are used in order to provide the required flexibility as well as sufficient pressure resistance and tensile strength and, at the same time, to ensure that expansibility is limited in the pressurized state. Thus, foils can be based on PVC, polypropylene or ABS (acrylonitrile butadiene styrene copolymers). Preferred are seawater and UV resistant plastics, such as ethylene tetrafluoroethylene (ETFE) copolymers, which may all contain corresponding stabilizers.

The minimum number of inventive buoyancy bodies of three results from the effect described above. Only with three buoyancy bodies or more, which are arranged offset, i.e. not in a straight line, preferably being offset to each other by 120°, around the center of gravity of the platform, the above restoring force against tilting, which results from potential under- and over-pressures in the hollow spaces, can unfold. Generally, this is the reason why preferred embodiments of the present invention have three or more buoyancy bodies symmetrically arranged around the center of gravity of the platform. In some preferred embodiments, the cover element is square, and four or nine buoyancy bodies are symmetrically arranged around its center. Or any number larger than 3 can be arranged in a circular, cross-shaped or star-shaped manner around the center of gravity.

The relation between the sum total of the cross-sectional areas or the hollow space volumes of the buoyancy bodies and the surface of the cover element is not specifically limited as long as the volume of the hollow spaces enclosed by the buoyancy bodies is sufficient to provide the entire floating platform including the load carried thereon, e.g. a solar power plant, with the required buoyancy. Preferably, the sum total of the cross-sectional areas of the buoyancy bodies is at least half of the area of the cover element in order to limit the overpressure in the buoyancy bodies.

When the relation between the sum total of the cross-sectional areas of the buoyancy bodies and the surface of the cover element is relatively small, the buoyancy bodies are preferably attached at the edges of the platform in order to avoid tilting.

The vertical cross-sectional shape of the buoyancy bodies is not particularly limited as long as they are open at the bottom and leakage of the introduced pressurized air is effectively prevented. Preferred is thus a cross-sectional profile substantially corresponding to a U upside down, even more preferred is an upside-down U profile whose cross-section is tapered downwards, which increases the dimensional stability of the buoyancy body.

The cover element is not particularly limited. Contrary to the state of the art, it does not have to be a continuous cover element, because it is not the upper boundary of the hollow space filled with pressurized air lying underneath. Thus, the cover element of the invention may, for example, also be a lattice structure, which is preferable in view of low weight. In addition to low weight, a lattice design also has the advantage that rain or splash water can run off freely. In case of continuous cover elements, this may be achieved by providing corresponding discharge outlets.

The shape of the cover element is not particularly limited, either. However, for reasons of stabilization against waves from all directions, a symmetric shape such as a circle or square is preferred.

Pipe or tube connections extend from the at least one device for generating pressurized air, which, for safety reasons, preferably comprises at least two devices, e.g. compressors, into the hollow spaces of the buoyancy bodies, so as to fill them with pressurized air. Preferably, these air feed lines enter the respective buoyancy body from the top and lead to its center in order to provide for a uniform filing of the buoyancy body. The buoyancy bodies can, if their construction does not allow otherwise, have pressure relief valves in order to prevent overstretching or even bursting of the buoyancy bodies in case of malfunctions of the compressors. These pressure relief valves are, if present, provided at a height where they are above the water level when the floating platform is operated normally. Due to production costs, however, pressure relief valves are not preferred.

Theoretically, a different gas than air may be used for filling the buoyancy bodies, e.g. a noble gas. For reasons of costs and in view of availability during offshore operation, however, air will be the gas of choice.

Furthermore, in preferred embodiments, the lower edges of the buoyancy bodies are loaded with weights in a conventional manner in order to avoid that external effects such as waves, flotsam or larger marine animals lift or press them to the surface, where the air can escape from the hollow space.

Because of similar considerations, the buoyancy bodies are internally braced in preferred embodiments of the invention in order to maintain the volume in the individual hollow spaces substantially constant. For this purpose, opposite points of the interior walls may be connected via braces, e.g. made of aluminum or plastic, for example 4 points may be connected in a cross shape, or 6 or 8 points may be connected in a star shape.

In particularly preferred embodiments of the inventive floating platform, one or more spar buoys or similar elements are attached to the bottom side of the cover element in addition to the buoyancy bodies. They not only increase the buoyancy created by the buoyancy bodies, but may also act as drag anchors to a certain extent, by counteracting drifting of the floating platform. Additionally, such spar buoys may replace some of the buoyancy bodies as long as the remaining number suffices to create the required buoyancy.

Furthermore, one or more closed floating bodies may be attached to the bottom of the cover element, e.g. closed floating bodies filled with air or floating bodies of a material having low density and high self-buoyancy, e.g. plastic foam. They increase, on the one hand, safety in case of a complete breakdown of the compressors, on the other hand they facilitate transport and positioning of the floating platform before putting it into operation, i.e. before the hollow spaces of the buoyancy bodies are filled with air.

To stabilize the platform, these closed floating bodies have a profile that is preferably tapered downwards. For maximizing their effect, preferably one or more such closed floating bodies are provided within each buoyancy body and/or around it, even more preferably within each single buoyancy body and/or around it. Preferably, each buoyancy body is provided with at least one closed floating body, and—even more preferably—additionally one circular and/or several circular segment-shaped closed floating bodies is/are provided around each buoyancy body.

In general, when spar buoys or closed floating bodies are present, several spar buoys or several closed floating bodies are arranged symmetrically around the center of gravity of the platform, which provides protection against effects of the waves.

The dimensions of the inventive floating platform are not particularly limited. In preferred embodiments with a (rotationally) symmetric circular or square shape, the cover element may, for example, have a diameter or a lateral length of a few meters up to several hundred meters.

Also, the inventive platform is preferably provided with drive elements in order to be able to move it on the water, in particular to rotate it around a vertical axis. This is of enormous importance when using floating solar power plants, so that solar collectors carried on the platform may be oriented according to the incident angle of the sunrays. These drive elements are not particularly limited, for example marine engines with screw propellers can be used. In view of the use of the platform for solar power plants, electromotors are preferred, which may be operated using part of the generated solar energy.

The floating platform of the present invention is not limited to offshore solar power plants, but may basically be used for any purpose, e.g. as a landing space for helicopters. However, they are preferably used for carrying a plant for generating solar energy, because according to the invention, the platform is particularly well stabilized against tilting, which directly improves the efficiency of the solar power plant.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
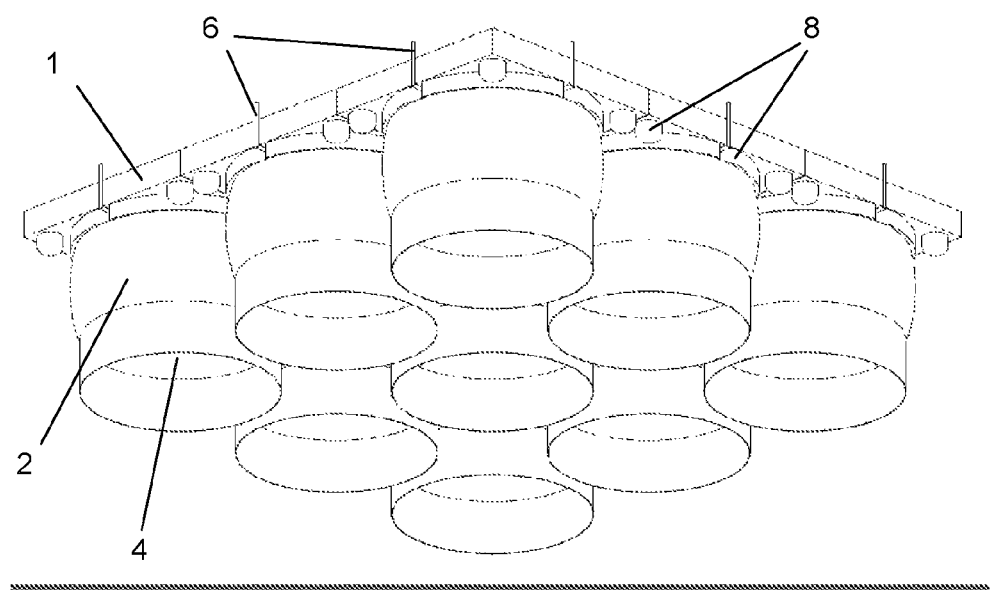
FIG. 1 shows a schematic isometric representation of an embodiment of the inventive floating platform in a slanted view from below.

FIG. 1 shows a preferred embodiment of the inventive floating platform in an isometric, slanted view from below. The cover element 1, here shown to be continuous, has a square shape. At its bottom side, nine buoyancy bodies 2 are arranged symmetrically around the square (one right in the center of gravity), the cross-sectional areas of which together cover most of the area of the cover element 1.

Each buoyancy body 2 has (in its pressurized state) a cross-sectional shape that substantially corresponds to an upside-down U profile, the cross section of which is tapered downwards and which, together with the water surface (not shown), defines a hollow space 4. The reference number 6 marks air suction lines leading to pumps (not shown) and from there to the individual buoyancy bodies. Next to the buoyancy bodies and around them, additional closed floating bodies 8 are provided. The latter each have the shape of circular ring segments, as this is better shown in the Figures described below.

Figure 2:
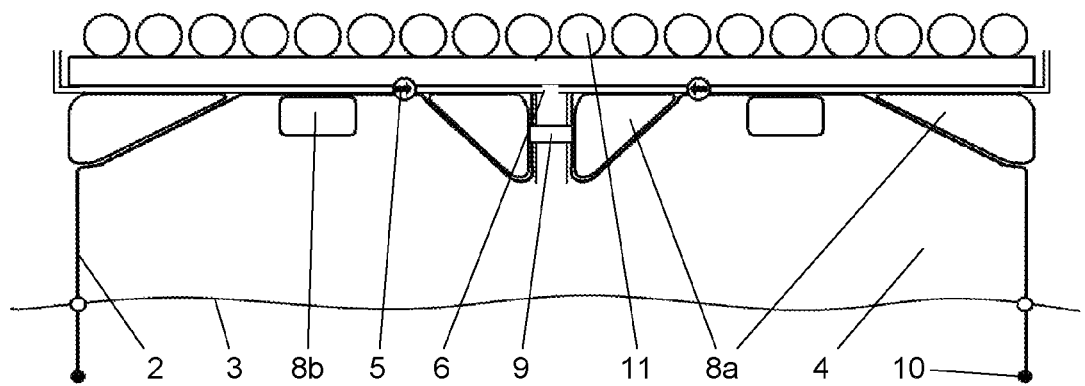
FIG. 2 shows a schematic vertical cross-sectional view of an embodiment of a buoyancy body of the inventive floating platform.

FIG. 2 is a schematic vertical cross-sectional view of an embodiment of a buoyancy body of the inventive platform. Reference number 2 again marks the membrane wall of the buoyancy body, 3 is the water surface, and 4 is again the hollow space thereabove. In addition, two air pumps or compressors 5 are shown. As can be better seen in further drawings, in preferred embodiments of the invention, each buoyancy body 2 is provided with air from several compressors 5 in order to prevent malfunctions.

The air feed line 6 enters the buoyancy body 2 in its center. Either in the air feed line 6 or in the area of the sealing body 9 between air feed line and buoyancy body, a check valve can be provided. The lower edge of the buoyancy body 2 is loaded with weights 10 in order to guarantee its immersion. Reference number 8 again marks closed floating bodies, wherein 8a are closed floating bodies outside, i.e. above, the floating bodies 2, and 8b are closed floating bodies within the same. At the top, a plurality of tubular sun collectors 11 supported on the cover element are shown as examples.

Figure 3:
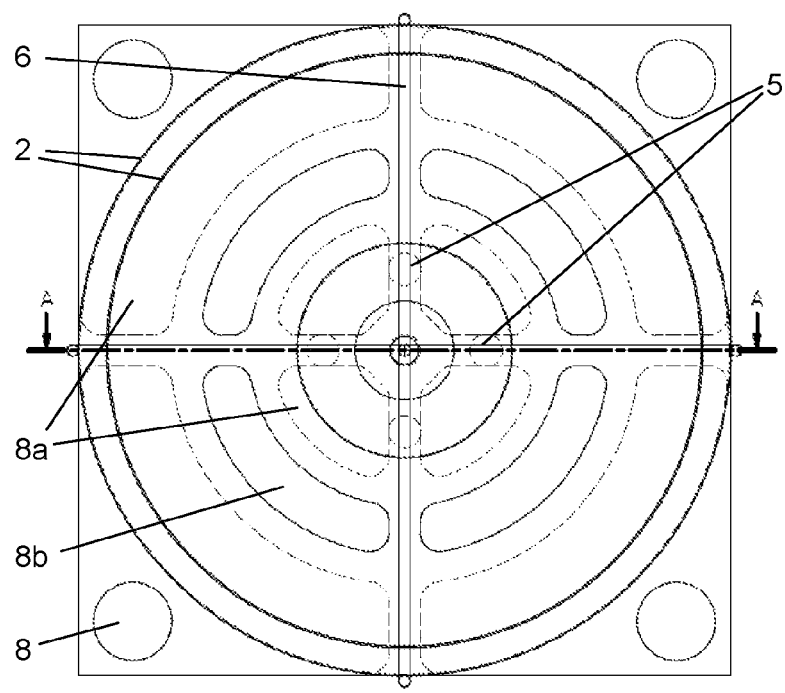
FIG. 3 shows a schematic view from below of a buoyancy body of the inventive floating platform.

FIG. 3 is a schematic view from below of a similar buoyancy body as in FIG. 2. Reference number 2 again marks the membrane wall of the buoyancy body, wherein the inner circle of the two concentric circles represents the downward tapering. In total, four air blowers or compressors 5 can be seen, which may recharge the buoyancy body. Again, closed floating bodies located outside the buoyancy body 2 (i.e., above it and thus drawn with dashed lines in the present view from below) are marked with 8a, and those within are marked by 8b. Four closed floating bodies located next to the buoyancy body 2 are simply marked with 8.

Figure 4:
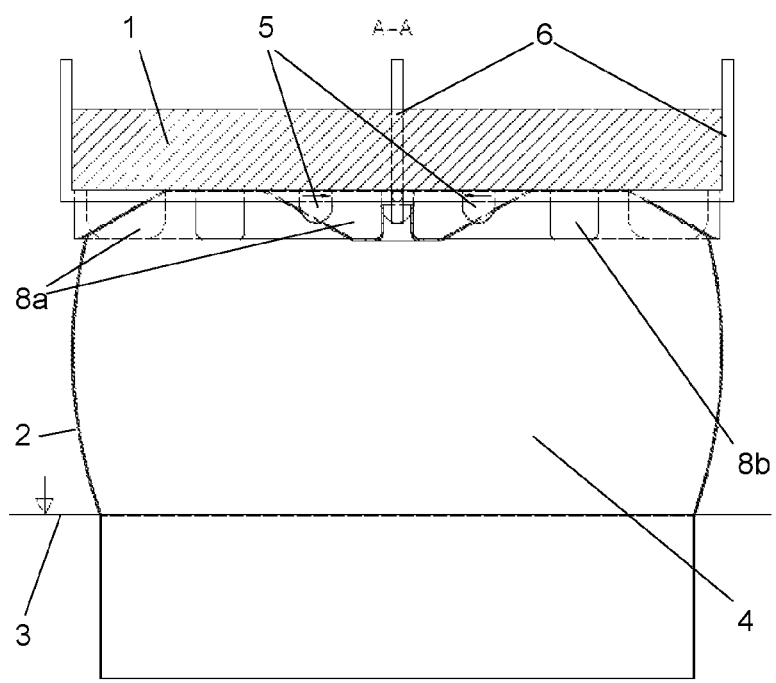
FIG. 4 shows a schematic vertical cross-sectional view of the embodiment of a buoyancy body from FIG. 3.

FIG. 4 is a schematic vertical cross-sectional view of the buoyancy bodies of FIG. 3 along the line A-A therein with the same components and reference numbers.

Figure 5:
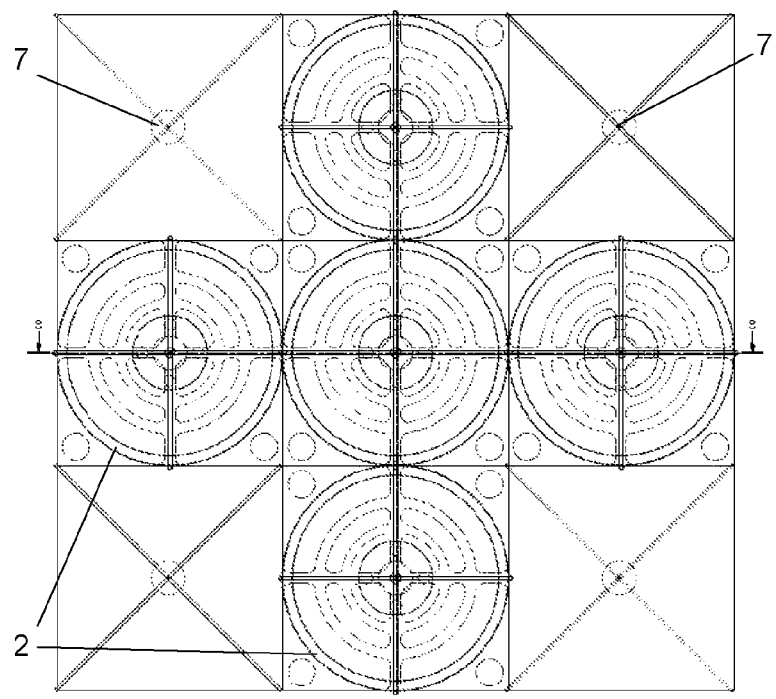
FIG. 5 shows a schematic view from below of an embodiment of the inventive floating platform using several buoyancy bodies from FIG. 4.

FIG. 5 is a schematic view from below of an embodiment of the inventive floating platform using several of the floating bodies shown in FIGS. 3 and 4. More specifically, an inventive floating platform can also be assembled in a modular manner by combining individual portions provided with buoyancy bodies and optionally with closed floating bodies and/or spar buoys or the like to provide the final platform. This facilitates the production of the inventive platform, because only a few different modules have to be manufactured, which can then be specifically combined to provide the platform best suited for the respective planned site of operation and the sea and wind conditions at that place. Also for this reason, the preferred shape of the inventive platform is a square.

FIG. 5 illustrates such a modular design, wherein five modules having buoyancy bodies 2 and closed floating bodies, as shown in FIGS. 3 and 4, are connected in a cross-shape and arranged point-symmetrically around the center of gravity. In the corners of the platform, four modules are provided, which do not have a buoyancy body or closed floating body, but only one spar buoy 7 each. Just like the other examples, this one only serves for illustration purposes and does not limit the invention in any way. For example, spar buoys can also be provided within the buoyancy bodies.

Figure 6:
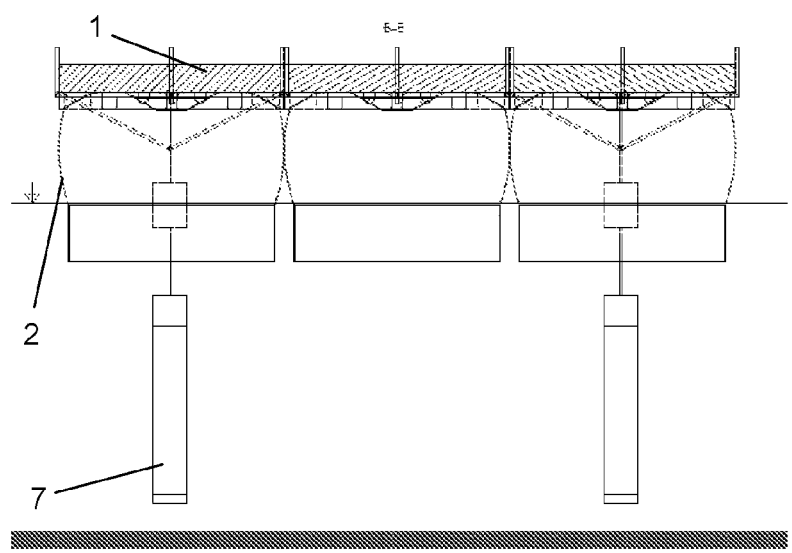
FIG. 6 shows a schematic vertical cross-sectional view of the embodiment of the inventive floating platform from FIG. 5.

FIG. 6 is a schematic vertical cross-sectional view of the embodiment of the inventive floating platform of FIG. 5 along the line B-B therein.

Consequently, the present invention provides a floating platform which, compared to similar platforms according to the state of the art, is much better stabilized against tilting due to the effects of wind and waves and is thus particularly well suited as a platform for offshore solar power plants.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A floating platform comprising the following:
   a) a cover element;
   b) at least three buoyancy bodies separated from each other and attached in a stationary manner on a the bottom side of the cover element, the buoyancy bodies being open at their bottoms and made of a gas-tight, pressure- and corrosion-resistant, flexible material, each of the buoyancy bodies enclosing a closed hollow space at contact with a surface of a liquid in which the platform floats; and
   c) at least one device for generating pressurized air for creating an over-pressure in the closed hollow spaces;
   wherein each of the buoyancy bodies has a circular horizontal cross-section and a vertical cross-sectional profile substantially corresponding to an upside down U; and
   wherein lower edges of the buoyancy bodies are loaded with weights.

2. The floating platform according to claim 1, wherein the vertical cross-sectional profile of the buoyancy bodies substantially corresponding to an upside-down U is tapered downwardly.

3. The floating platform according to claim 1, wherein the buoyancy bodies are internally braced.

4. The floating platform according to claim 1, wherein the buoyancy bodies are arranged symmetrically around a center of the platform.

5. The floating platform according to claim 4, wherein the platform is square, and wherein four or nine buoyancy bodies are arranged symmetrically around the center of the platform.

6. The floating platform according to claim 1, wherein an air feed line leads from the device for generating pressurized air to the center of each of the buoyancy bodies.

7. The floating platform according to claim 1, further comprising at least one spar buoy attached to the bottom side of the cover element.

8. The floating platform according to claim 1, further comprising at least one closed floating body attached to the bottom side of the cover element.

9. The floating platform according to claim 8, wherein the at least one closed floating body has a cross-sectional profile tapered downwardly and toward an edge of the platform.

10. The floating platform according to claim 8, wherein the at least one closed floating body is provided within each of the buoyancy bodies or around each of the buoyancy bodies.

11. The floating platform according to claim 7, wherein several spar buoys are arranged symmetrically around the center of gravity of the platform.

12. The floating platform according to claim 7, wherein several closed floating bodies are arranged symmetrically around the center of gravity of the platform.

13. The floating platform according to claim 1, wherein the platform is adapted to carry a plant for generating solar energy.

\* \* \* \* \*